(12) United States Patent
Yamane

(10) Patent No.: US 11,150,226 B2
(45) Date of Patent: Oct. 19, 2021

(54) GAS CHROMATOGRAPH WITH EASE OF ERROR IDENTIFICATION

(71) Applicant: Shimadzu Corporation, Kyoto (JP)

(72) Inventor: Masashi Yamane, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 54 days.

(21) Appl. No.: 16/357,692

(22) Filed: Mar. 19, 2019

(65) Prior Publication Data

US 2019/0293613 A1   Sep. 26, 2019

(30) Foreign Application Priority Data

Mar. 20, 2018   (JP) .............................. JP2018-052149

(51) Int. Cl.
   *G01N 30/62*   (2006.01)
   *G01N 30/60*   (2006.01)
   *G01N 30/02*   (2006.01)

(52) U.S. Cl.
   CPC ............. *G01N 30/62* (2013.01); *G01N 30/60* (2013.01); *G01N 2030/025* (2013.01)

(58) Field of Classification Search
   CPC .... G01N 30/62; G01N 30/60; G01N 30/8658; G01N 2030/8804; G01N 30/88; G01N 30/8675
   See application file for complete search history.

(56) References Cited

U.S. PATENT DOCUMENTS

2007/0150785 A1* 6/2007 Munetaka .............. G06F 11/28
                                                              714/746
2017/0108211 A1* 4/2017 Satoh .................... F24H 9/2035

FOREIGN PATENT DOCUMENTS

| JP | 2007-24650 A | 2/2007 |
|---|---|---|
| JP | 2009-300340 A | 12/2009 |
| JP | 4631687 B | 2/2011 |
| JP | 2017-26548 A | 2/2017 |
| JP | 2017-58159 A | 3/2017 |

OTHER PUBLICATIONS

Office Action dated Jan. 11, 2021 in corresponding Chinese Application No. 201910198400.0; 13 pages including English-language translation.
Office Action dated Aug. 26, 2021 in corresponding Japanese Application No. 2018-052149; 8 pages including English-language translation.

* cited by examiner

*Primary Examiner* — David Z Huang
(74) *Attorney, Agent, or Firm* — Maier & Maier, PLLC

(57) ABSTRACT

A gas chromatograph includes a display unit, indicators, and a display control unit. The gas chromatograph is provided with a plurality of units having the same function, and the indicators are each associated with any of the plurality of units. When the error has occurred in any of the plurality of units in the gas chromatograph, processing of the display control unit displays an error notification screen on a display screen of a display unit, and in addition, operates an indicator associated with the unit in which the error has occurred. Therefore, a user can recognize in which of the plurality of units the error has occurred.

4 Claims, 5 Drawing Sheets

[FIG. 1]
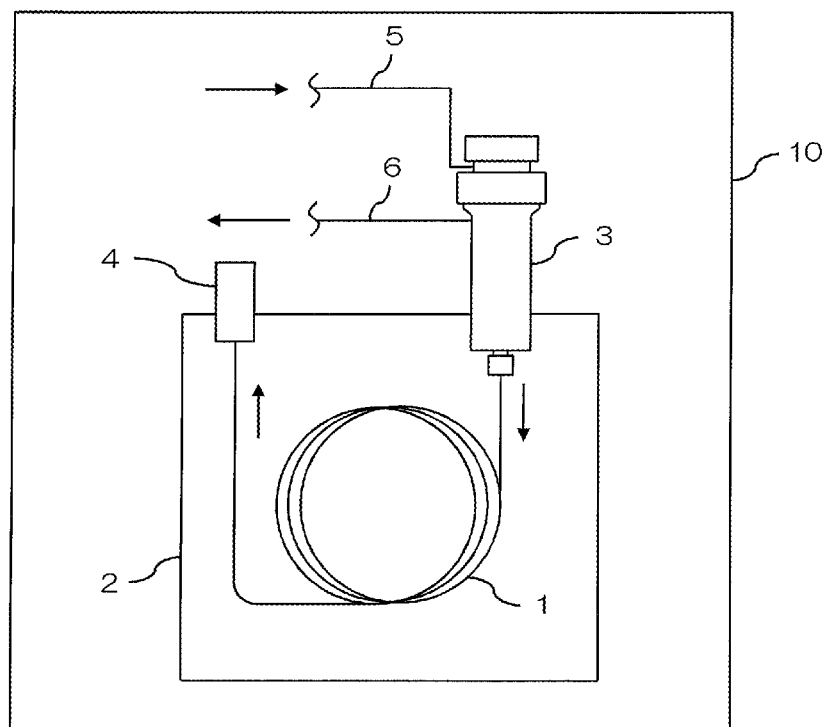

[FIG. 2]
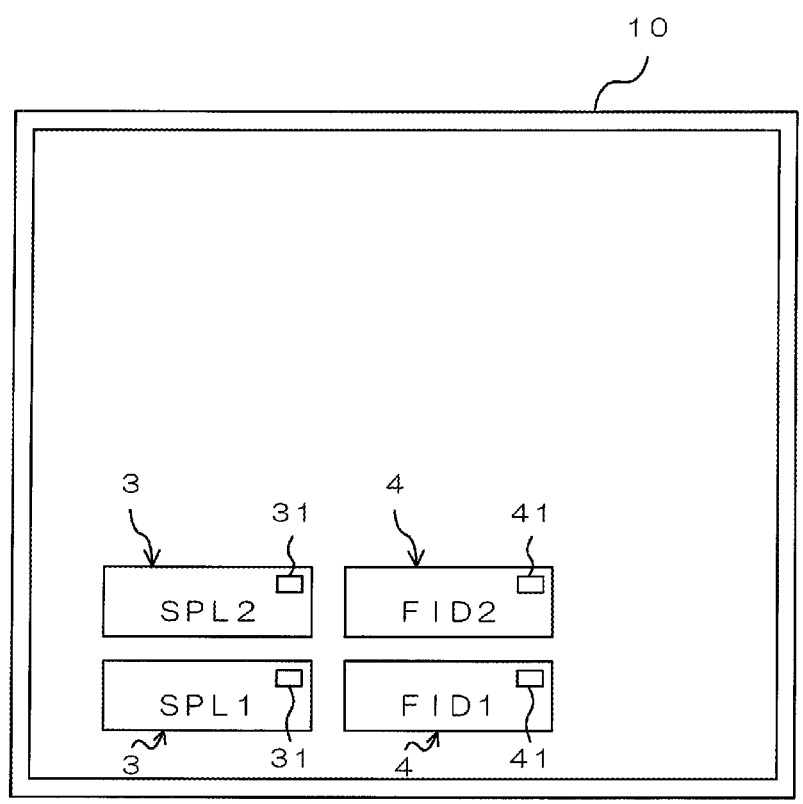

[FIG. 3]
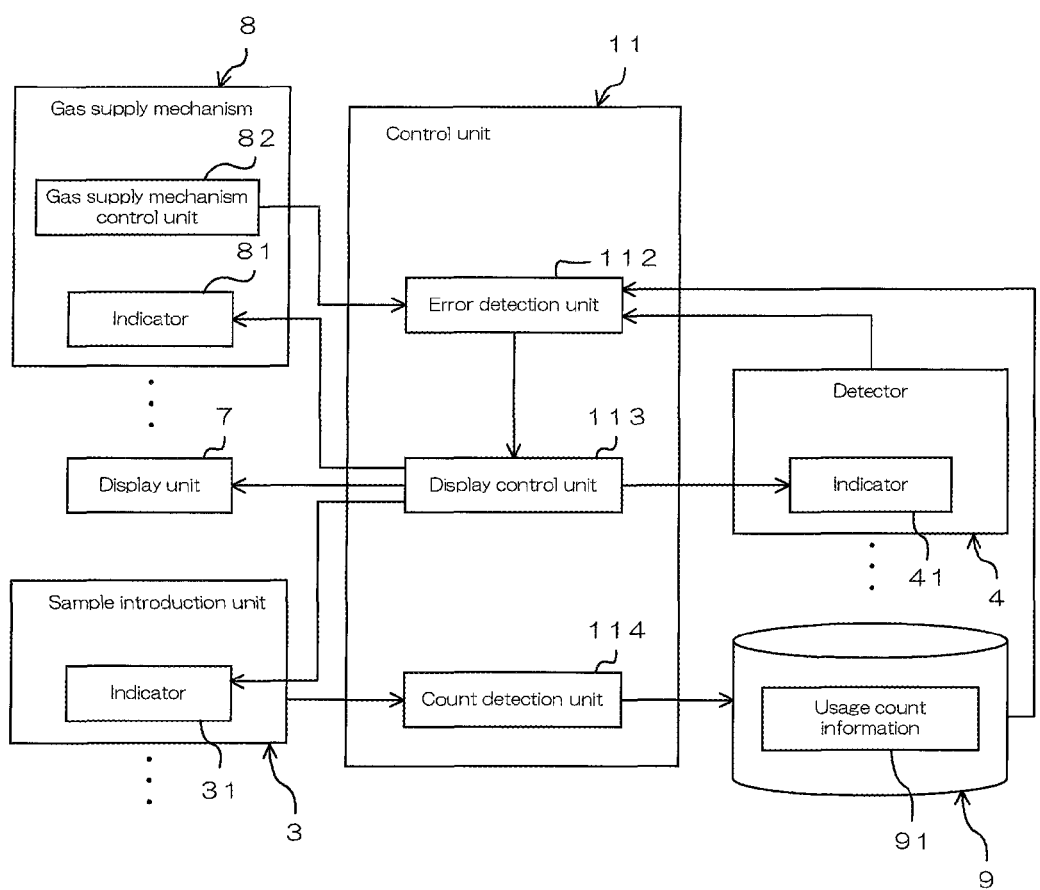

[FIG. 4]
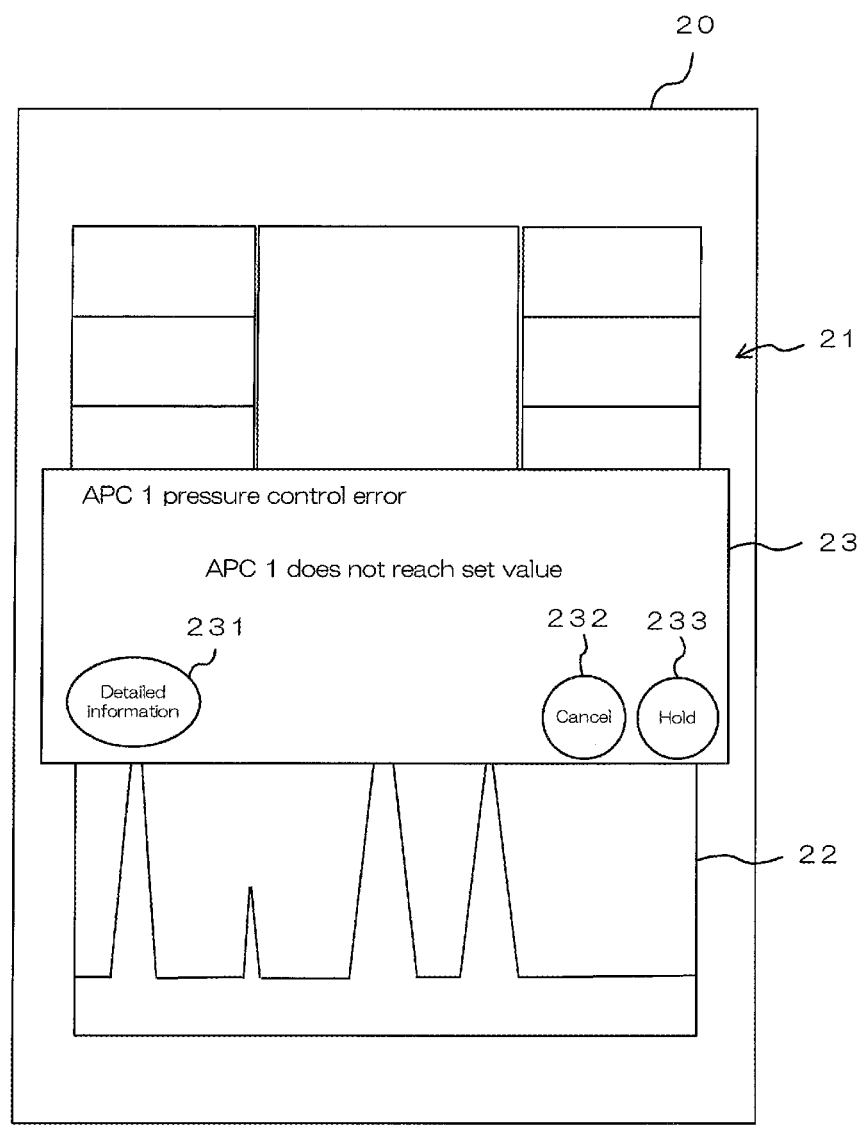

[FIG. 5]
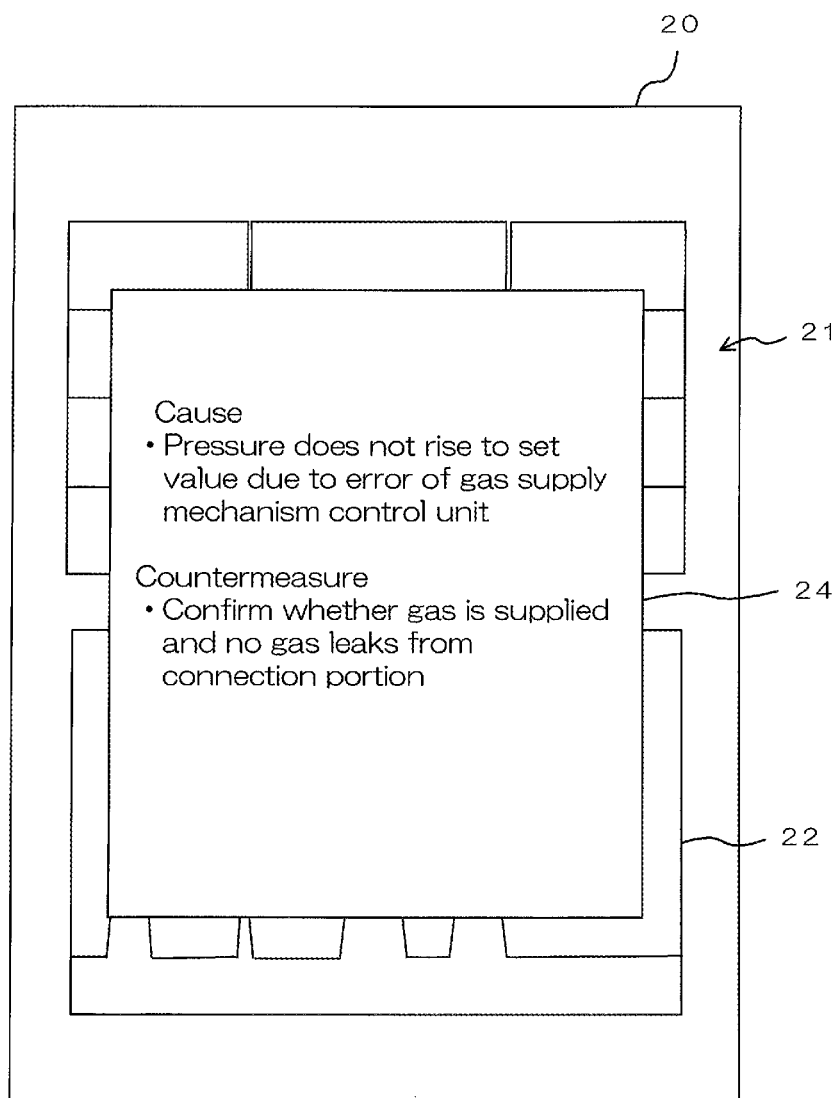

GAS CHROMATOGRAPH WITH EASE OF ERROR IDENTIFICATION

CROSS-REFERENCE TO RELATED APPLICATION

This application claims the priority of Japan patent application serial no. 2018-052149, filed on Mar. 20, 2018. The entirety of the above-mentioned patent application is hereby incorporated by reference herein and made a part of this specification.

FIELD

The present invention relates to a gas chromatograph capable of making an analysis using a plurality of units having the same function.

BACKGROUND

The gas chromatograph includes units such as a sample introduction unit, a detection unit and a gas supply unit. In the gas chromatograph, a sample is analyzed in a state where these units are operated.

When the sample is analyzed by the gas chromatograph, each of the units sometimes fails to operate normally. In this case, a correct analysis result cannot be obtained even if the analysis operation is continued. Therefore, there is proposed a gas chromatograph that gives notice of an occurrence of an error on a display screen provided thereon when an abnormality occurs in the unit (see, for example, JP-B2-4631687).

In this way, a user can recognize that a malfunction has occurred in the unit.

However, a plurality of units having the same function are sometimes provided in the gas chromatograph. For example, a gas chromatograph provided with a plurality of sample introduction units and a plurality of detectors is sometimes used.

When any of the units fails to operate normally in the gas chromatograph as described above, notice of an error display of the unit will be given on the display screen. In this case, while the user can recognize in which type of the unit the error has occurred, the user cannot immediately identify in which of the units of that type the error has occurred. Such a malfunction sometimes occurs.

For example, when the error of the sample introduction unit is displayed on the display screen, the user can recognize that the error has occurred in the sample introduction unit. However, the user cannot immediately identify in which of the plurality of sample introduction units the error has occurred. Particularly, when the plurality of sample introduction units have a similar shape, it takes time to identify in which sample introduction unit the error has occurred.

SUMMARY

The present invention has been made in consideration of the above-described circumstances. It is an object of the present invention to provide a gas chromatograph capable of easily identifying the unit in which the error has occurred when the error occurred in the plurality of units having the same function.

(1) A gas chromatograph according to the present invention is a gas chromatograph capable of making an analysis using a plurality of units having the same function. The gas chromatograph includes an error detection unit, a display unit, a plurality of indicators, and a display control unit. The error detection unit detects an occurrence of an error in the plurality of units. The display unit performs an error display on a display screen when the error has been detected by the error detection unit. The plurality of indicators are provided separately from the display unit and are individually associated with the plurality of units. The display control unit controls display by each of the display unit and the plurality of indicators. When the error has been detected by the error detection unit, the display control unit operates the indicator corresponding to the unit from which the error has been detected.

With such a configuration, when the error has occurred in any of the plurality of units in the gas chromatograph, the error display is performed on the display screen, and in addition, an indicator associated with the unit in which the error has occurred is operated.

Therefore, by the display of the display screen, a user can be notified that the error has occurred in the unit, and in addition, by operating the indicator, the user can recognize in which of the plurality of units the error has occurred.

As a result, when the error has occurred in a certain unit of the plurality of units having the same function, the unit in which the error has occurred can be easily identified.

(2) Moreover, the plurality of units may have the same shape individually.

With such a configuration, even in a situation where it is difficult to distinguish a specific unit, the unit in which the error has occurred can be identified with ease.

As described above, in a case of the configuration described above, it is more effective to operate the indicator associated with the unit in which the error has occurred in addition to performing the error display on the display screen.

(3) Further, when the error has been detected by the error detection unit, the display control unit may display how to handle the error on the display screen.

With such a configuration, even a user unaccustomed to the device can easily confirm how to handle the error.

Therefore, operability in the chromatograph can be enhanced.

(4) Moreover, the indicators may be individually provided in the units with which the indicators are associated.

With such a configuration, since correspondences between the indicators and the units are easy to understand, the unit in which the error has occurred can be identified more easily.

According to the present invention, when the error has occurred in any of the plurality of units in the gas chromatograph, the error display is performed on the display screen, and in addition, the indicator associated with the unit in which the error has occurred is operated. Therefore, by the display of the display screen, a user can be notified that the error has occurred in the unit, and in addition, by operating the indicator, the user can recognize in which of the plurality of units the error has occurred. As a result, when the error has occurred in a certain unit of the plurality of units having the same function, the unit in which the error has occurred can be easily identified.

BRIEF DESCRIPTION OF THE DRAWINGS

FIG. 1 is a schematic diagram showing a configuration example of a chromatograph according to an embodiment of the present invention;

FIG. 2 is a plan view schematically showing a state where an upper wall of a body of the chromatograph is detached;

FIG. 3 is a block diagram showing an electric configuration of a control unit and members surrounding the control unit;

FIG. 4 is a diagram showing a display example of a display screen on a display unit, and shows a state where an error display screen is displayed; and FIG. 5 is a diagram showing a display example of the display screen on the display unit, and shows a state where an error detail screen is displayed.

DETAILED DESCRIPTION

1. Overall Configuration of Gas Chromatograph

FIG. 1 is a schematic diagram showing a configuration example of a gas chromatograph according to an embodiment of the present invention. This gas chromatograph is a device for making an analysis by supplying sample gas into a column 1 together with carrier gas. Besides the column 1 described above, the gas chromatograph includes a column oven 2, a sample introduction unit 3, a detector 4, a hollow body 10 that houses these, and the like.

The column 1 is configured by, for example, a capillary column. The column 1 is housed in the column oven 2 together with a heater, a fan, and the like (all of which are not shown).

The column oven 2 is a device for heating the column 1, and at the time of the analysis, appropriately drives the heater and the fan.

The sample introduction unit 3 is a sample introduction unit (SPL) for introducing the carrier gas and the sample gas into the column 1, and is provided with a septum (not shown). Moreover, a sample vaporizing chamber (not shown) is formed in an inside of the sample introduction unit 3. A liquid sample is injected into this sample vaporizing chamber, and the sample vaporized in the sample vaporizing chamber is introduced into the column 1 together with the carrier gas. Moreover, a gas supply passage 5 and a split passage 6 communicate with the sample vaporizing chamber.

The gas supply passage 5 is a passage for supplying the carrier gas into the sample vaporizing chamber of the sample introduction unit 3.

The split passage 6 is a passage for discharging a part of the gas (mixed gas of the carrier gas and the sample gas) in the sample vaporizing chamber to an outside in a predetermined split ratio at the time of introducing the carrier gas and the sample gas into the column 1 by a split introduction method.

For example, the detector 4 is configured by a flame ionization detector (FID). That is, at the time of operating the gas chromatograph, a hydrogen flame is ignited in the detector 4. Moreover, the detector 4 sequentially detects sample components contained in the carrier gas introduced from the column 1.

At the time of measuring the sample in this gas chromatograph, first, the hydrogen flame is ignited in the detector 4, and the detector 4 is activated. Then, the sample serving as an analysis target is injected into the sample introduction unit 3. The sample is vaporized in the sample vaporizing chamber. Moreover, the carrier gas is supplied to the sample vaporizing chamber of the sample introduction unit 3 via the gas supply passage 5.

The sample vaporized in the sample vaporizing chamber is introduced into the column 1 together with the carrier gas. The sample components contained in the sample are separated in a process of passing through an inside of the column 1, and are sequentially introduced into the detector 4.

Then, in the detector 4, the sample components contained in the carrier gas introduced from the column 1 are sequentially detected. Moreover, a chromatogram is created based on a detection result in the detector 4.

Further, in this gas chromatograph, a plurality of units having the same function are provided. The plurality of units having the same function refer to the plurality of units of the same type. For example, although not shown, pluralities of units such as the columns 1, the sample introduction units (SPLs) 3 and the detectors (FIDs) 4, which are described above, are provided in the body 10. In the gas chromatograph, the plurality of units of the same type have the same shape. In the gas chromatograph, the units operate, whereby the sample is analyzed under a variety of conditions.

2. Configuration of Indicator

FIG. 2 is a plan view schematically showing a state where an upper wall of the body 10 of the chromatograph is detached. As shown in FIG. 2, in the state where the upper wall of the body 10 is detached, the user can confirm the plurality of sample introduction units (SPLs) 3 and the plurality of detectors (FIDs) 4. In FIG. 2, shapes and dispositions of the sample introduction units (SPLs) 3 and the detectors (FIDs) 4 are schematically shown. Moreover, in FIG. 2, reference numerals are assigned to the sample introduction units (SPLs) 3 and the detectors (FIDs) 4 in order that the sample introduction units (SPLs) 3 can be distinguished from one another and that the detectors (FIDs) 4 can be distinguished from one another.

In the chromatograph, indicators are provided in association with the respective units. For example, indicators 31 are provided on outer surfaces of the respective sample introduction units (SPLs) 3. Moreover, indicators 41 are provided on outer surfaces of the respective detectors (FIDs) 4.

Each of the indicators 31 and the indicators 41 is configured by, for example, an LED or the like. Note that each of the indicators 31 and the indicators 41 may be configured by a displaying member other than the LED.

With such a configuration, in the state where the upper wall of the body 10 is detached, the user can confirm the indicators associated with the respective units.

As will be described later, in the gas chromatograph, the plurality of units of the same type other than the sample introduction units 3 and the detectors 4 are provided, and indicators are also provided on these units.

3. Electric Configuration of Control Unit and Members Surrounding the Control Unit FIG. 3 is a block diagram showing an electric configuration of a control unit 11 and members surrounding the control unit 11.

In addition to the sample introduction units 3 and the detectors 4, which are described above, the gas chromatograph includes, as an electric configuration, a display unit 7, gas supply mechanisms 8, a storage unit 9, the control unit 11, and the like.

The display unit 7 is provided in the body 10 (refer to FIG. 1). The display unit 7 includes a touch panel. That is, the user can confirm information by the display unit 7, and in addition, can perform an input operation by the display unit 7.

The gas supply mechanisms (APCs) 8 include gas supply mechanisms for the sample introduction units and gas supply mechanisms for the detectors. The gas supply mechanisms 8 for the sample introduction units are mechanisms for supplying the carrier gas to the gas supply passage 5, and the gas supply mechanisms 8 for the detectors are mechanisms for supplying detector gas to the detectors 4. Each of the gas supply mechanisms 8 includes an indicator 81 and a gas supply mechanism control unit 82. Although not shown, each of the gas supply mechanisms 8 for the sample introduction units includes a cylinder in which the carrier gas is stored, a pipe that connects the cylinder and the gas supply passage 5 to each other, and the like.

Each of the indicators 81 is configured by, for example, an LED or the like. For example, the indicator 81 is attached in the pipe that connects the cylinder and the gas supply passage 5 to each other. Note that the indicator 81 may be configured by a displaying member other than the LED.

The gas supply mechanism control unit 82 performs processing for controlling an operation of the gas supply mechanism 8.

In the gas chromatograph, a plurality of gas supply mechanisms 8 of the same type are provided. That is, in the gas chromatograph, the plurality of gas supply mechanisms 8 are provided as units having the same function. The plurality of gas supply mechanisms 8 may have the same shape.

The storage unit 9 is configured by a read only memory (ROM), a random access memory (RAM), a hard disk, and the like. Usage count information 91 is stored in the storage unit 9. The usage count information 91 is information on a usage count of the sample introduction unit 3 (septum of the sample introduction unit 3).

The control unit 11 has a configuration including, for example, a central processing unit (CPU). The units such as the sample introduction units 3, the detectors 4, the display unit 7, the gas supply mechanisms 8, and the storage unit 9 are electrically connected to the control unit 11. The CPU executes a program, whereby the control unit 11 functions as an error detection unit 112, a display control unit 113, a count detector 114, and the like.

The error detection unit 112 performs processing for detecting an error of each of the detectors 4 based on a signal from the detector 4. Moreover, based on the usage count information 91 in the storage unit 9, the error detection unit 112 performs processing for detecting an error of each of the sample introduction units 3 when a usage count of the sample introduction unit 3 exceeds a predetermined value. Further, the error detection unit 112 performs processing for detecting an error of each of the gas supply mechanisms 8 based on a signal from the gas supply mechanism control unit 82.

The display control unit 113 performs processing for controlling operations of the indicators of the respective units based on a detection result of the error detection unit 112. Moreover, the display control unit 113 performs processing for causing the display unit 7 to display a predetermined display content based on the detection result of the error detection unit 112 and the input operation by the user.

The count detector 114 performs processing for detecting the usage count of each of the sample introduction units 3 (septum of the sample introduction units 3) based on a signal from the sample introduction unit 3.

4. Display Mode of Display Screen

FIG. 4 is a diagram showing a display example of the display screen 20 on the display unit 7, and shows a state where an error notification screen 23 is displayed.

During an operation of the gas chromatograph, the display screen 20 is displayed on the display unit 7. When the gas chromatograph is operating in a normal state (state where no error occurs), the display screen 20 is displayed as a basic screen. Then, as will be described later, when an error occurs in any of the units in the gas chromatograph, the error notification screen 23 that gives notice of the occurrence of the error is displayed on the display screen 20.

An operation display region 21 and a graph display region 22 are included in the display screen 20 in a state of the basic screen.

The operation display region 21 is a region for displaying operation states of a variety of components in the gas chromatograph. The graph display region 22 is a region for displaying in real time the chromatogram created based on a detection signal from each of the detectors 4.

When the error occurs in any of the units in the gas chromatograph, the error notification screen 23 is displayed so as to overlap an operation display region 21 and a graph display region 22.

On the error notification screen 23, a message indicating that the error has occurred in any of the units; a detailed information button 231; a cancel button 232; and a hold button 233 are displayed. In this example, a message indicating that the error has occurred in the gas supply mechanism 8 is displayed on the error notification screen 23.

The detailed information button 231 is a button for displaying detailed information of the error.

The cancel button 232 is a button for canceling error detection.

The hold button 233 is a button for continuing the operation while suspending the error detection.

FIG. 5 is a diagram showing a display example of the display screen 20 on the display unit 7, and shows a state where an error detail screen 24 is displayed.

As will be described later, when the detailed information button 231 is touched in a state where the display screen 20 shown in FIG. 4 is displayed on the display unit 7, the error detail screen 24 is displayed as shown in FIG. 5.

On the error detail screen 24, a message indicating a cause of the occurrence of the error and a message indicating how to handle (take measures against) the error are displayed. In this example, a message indicating a cause of the error that occurred in the gas supply mechanism 8 and how to handle the error of the gas supply mechanism 8 are displayed on the error detail screen 24.

5. Control Operations of Control Unit

During the operation of the gas chromatograph, the display screen 20 in the state of the basic screen is displayed on the display unit 7. That is, the operation display region 21 and the graph display region 22 are displayed on the display screen 20.

Then, when the error occurs in any of the units in the gas chromatograph, the error detection unit 112 detects in which unit the error has occurred. Then, as shown in FIG. 4, the display control unit 113 displays the error notification screen 23 so as to overlap the operation display region 21 and the graph display region 22. Moreover, the display control unit 113 operates the indicator corresponding to the unit in which the error has occurred.

For example, when the analysis operation is performed in the gas chromatograph, the count detector 114 detects the usage count of the sample introduction unit 3 based on the signal from the sample introduction unit 3. Then, the count detector 114 stores the detected usage count as the usage count information 91 in the storage unit 9.

The error detection unit 112 reads the usage count information 91 in the storage unit 9, and compares a value thereof (usage count of the sample introduction unit 3) with a threshold. Then, when the read value exceeds the threshold, the error detection unit 112 detects that the error has occurred in the sample introduction unit 3 (that is, that the usage count of the sample introduction unit 3 is excessive).

Moreover, during the operation of the gas chromatograph, the error detection unit 112 receives a signal from the detector 4. The error detection unit 112 detects that the error has occurred in the detector 4 when an abnormality occurs in the signal of the detector 4.

Moreover, during the operation of the gas chromatograph, the error detection unit 112 receives a signal from the gas supply mechanism control unit 82. The error detection unit 112 detects that the error has occurred in the gas supply mechanism 8 when an abnormality occurs in the signal of the gas supply mechanism control unit 82.

When the error detection unit 112 detects the error of the unit as described above, the display control unit 113 displays the error notification screen 23 on the display screen 20, and operates the indicator corresponding to the unit in which the error has occurred.

For example, when the error detection unit 112 detects the occurrence of the error in the gas supply mechanism 8, then as shown in FIG. 4, the display control unit 113 displays the error notification screen 23 related to the gas supply mechanism 8 on the display screen 20. Then, the display control unit 113 turns on the indicator 81 corresponding to the gas supply mechanism 8 in which the error has occurred.

In this way, the user first recognizes that the error has occurred in the gas supply mechanism 8 by the error notification screen 23 displayed on the display screen 20.

Then, the user confirms that the indicator 81 is turned on, thereby confirming the gas supply mechanism 8 with which the indicator 81 is associated.

In this way, even if the plurality of gas supply mechanisms 8 are provided, gas supply mechanism 8 in which the error has occurred can be easily confirmed.

In a similar way, when the error occurs in the sample introduction unit 3, the error notification screen 23 indicating the occurrence of the error in the sample introduction unit 3 is displayed on the display screen 20, and in addition, the indicator 31 associated with the sample introduction unit 3 is turned on. Moreover, when the error occurs in the detector 4, the error notification screen 23 indicating the occurrence of the error in the detector 4 is displayed on the display screen 20, and in addition, the indicator 41 associated with the sample detector 4 is turned on.

When the indicator 31 associated with the sample introduction unit 3 is turned on, and when the indicator 41 associated with the detector 4 is turned on, the user detaches the upper wall of the body 10, and can thereby easily confirm these indicators (refer to FIG. 2).

Moreover, when the user confirms the detailed information of the error, the user touches the detailed information button 231 on the error notification screen 23. Then, the error detail screen 24 is displayed on the display screen 20 in place of the error notification screen 23.

In this way, the user confirms the error detail screen 24, and can thereby confirm the cause of the error and the measures against the error.

Moreover, when the user cancels the error detection by the error detection unit 112, the user touches the cancel button 232 on the error notification screen 23. Moreover, when the user continues the analysis operation while suspending the error detection by the error detection unit 112, the user touches the hold button 233 on the error notification screen 23.

6. Operation and Effect (1) In the present embodiment, when the error has occurred in any of the plurality of units in the gas chromatograph, the processing of the display control unit 113 displays the error notification screen 23 on the display screen 20 of the display unit 7, and in addition, operates (turns on) the indicator associated with the unit in which the error has occurred.

Therefore, the user can be notified that there is a unit in which the error has occurred by the display of the error notification screen 23 on the display screen 20. Then, the indicator is operated, whereby the user can recognize in which of the plurality of units the error has occurred.

As a result, when the error has occurred in a certain unit of the plurality of units having the same function, the unit in which the error has occurred can be easily identified.

(2) Moreover, in the present embodiment, in the gas chromatograph, the plurality of units have the same shape.

Therefore, even in a situation where it is difficult to distinguish a specific unit, the unit in which the error has occurred can be identified with ease.

That is, in the gas chromatograph in the present embodiment, it is more effective to operate the indicator associated with the unit in which the error has occurred in addition to displaying the error notification screen 23 on the display screen 20.

(3) Further, in the present embodiment, when the error has been detected by the error detection unit 112, the display control unit 113 displays how to handle the error as the error detail screen 24 on the display screen 20.

Therefore, even a user unaccustomed to the device can easily confirm how to handle the error.

As a result, operability in the chromatograph can be enhanced.

(4) Moreover, in the present embodiment, the indicators are individually provided in the units with which the indicators are associated (that is, the respective indicators are provided in the respective units in which the indicators are associated). Specifically, the indicators 31 are provided in the sample introduction units 3. The indicators 41 are provided in the detectors 4. The indicators 81 are provided in the gas supply mechanisms 8.

As described above, since correspondences between the respective indicators and the respective units are easy to understand, the unit in which the error has occurred can be identified more easily.

7. Modified Example

The above embodiment has described that the indicators associated with the respective units are turned on when the error has occurred in the respective units. However, the indicators associated with the respective units may cause the user to recognize the unit in which the error has occurred by other operations. For example, the indicator associated with the unit in which the error has occurred may be caused to blink, or all the indicators may be turned on by the same color in advance, and only the unit in which the error has occurred may be turned on by a different color.

Moreover, the above embodiment has described that the indicators 31 and the indicators 41 are provided respectively on the outer surfaces of the sample introduction units 3 and the detectors 4. However, the respective indicators only need to be provided in association with the respective units, and may be provided on areas other than the outer surfaces of the respective members.

Moreover, the above embodiment has described that the sample introduction units are the sample introduction units (SPLs). However, the sample introduction units may be other than the SPLs.

Further, the above embodiment has described that the detectors are the flame ionization detectors (FIDs). However, the detectors may be other than the FIDs.

What is claimed is:

1. A gas chromatograph capable of making an analysis using a plurality of units having a same function, the gas chromatograph comprising:
    a body in which the plurality of units is provided;
    a display unit that performs an error display on a display screen when an error has been detected, the display unit being provided on the body;
    a plurality of indicators provided separately from the display unit and individually associated with the plurality of units; and
    a control unit electronically connected to the plurality of units and the display unit, the control unit comprising a central processing unit (CPU), the CPU configured to execute a program whereby the control unit functions as an error detection unit that detects an occurrence of the error in the plurality of units and a display control unit that controls display by each of the display unit and the plurality of indicators,
    wherein, when the error has been detected by the error detection unit, the display control unit operates the indicator corresponding to the unit from which the error has been detected; and
    wherein the error display performed by the display unit includes an information for identifying the unit in which the error has occurred.

2. The gas chromatograph according to claim 1, wherein the plurality of units have a same shape.

3. The gas chromatograph according to claim 1, wherein, when the error has been detected by the error detection unit, the display control unit causes the display screen to display how to handle the error.

4. The gas chromatograph according to claim 1, wherein the indicators are provided individually on the units with which the indicators are associated.

* * * * *